United States Patent Office 3,084,203
Patented Apr. 2, 1963

3,084,203
PREPARATION OF HALOGEN-CONTAINING STILBENES AND BIBENZYLS
William M. Le Suer and Carl W. Stuebe, Cleveland, Ohio, assignors to The Lubrizol Corporation, Willoughby, Ohio, a corporation of Ohio
No Drawing. Filed July 1, 1960, Ser. No. 40,191
15 Claims. (Cl. 260—649)

This invention relates to the preparation of halogen-containing aromatic compounds. In a more particular consideration, it relates to the preparation of such aromatic compounds which contain at least two aromatic nuclei.

This application is a continuation-in-part of application Ser. No. 779,285, filed December 10, 1958, and now U.S. 2,960,542, which application was in turn a continuation-in-part of application Ser. No. 539,683, filed October 10, 1955, and now abandoned.

The alpha,alpha'-diaryl ethylene nucleus has received serious consideration because of its recently discovered value in many applications. It is found, for example, within the chemical structure of brightening agents, sex hormones, etc. In view of such applications the synthesis and further exploitation of such chemical structures is desirable.

The particular products of the process of this invention are alpha,alpha'-diaryl ethylenes in which there is attached also at least one halogen atom to each of the carbon atoms of the ethylene residue. For economic reasons, the process of this invention is particularly applicable to the preparation of alpha,alpha'-diaryl ethylenes in which there is attached at least one chlorine atom to each of the carbon atoms of the ethylene residue. Illustrative of such compounds are the alpha,alpha'-dichlorostilbenes which comprise a preferred type of product of this invention. Other such products include the sym-diphenyltetrachloroethane.

It is accordingly a principal object of this invention to provide a novel method of preparation of the above-indicated halogen-containing aromatic compounds.

It is also an object of the present invention to provide a process for the preparation of halogen-substituted stilbenes.

It is also an object of the present invention to provide a process for the preparation of chlorine-containing stilbenes.

Other objects will be apparent from the following description.

These objects have been accomplished by the process of preparing halogen-containing compounds which comprises heating a mixture of:

(a) A trihalomethyl substituted aromatic compound having the structure $$Ar(CX_3)y$$

where Ar is a non-functional aromatic radical attached to the carbon atom through a benzenoid carbon atom, X is a halogen atom, and y is an integer between 1 and 3;
(b) Elemental phosphorus; and
(c) From about 0.001 to about 2.0% of the combined weight of (a) and (b) of a member selected from the class consisting of hydrocarbon iodides, ammonium iodides, and phosphorus iodides.

The trihalomethyl substituted aromatic compounds comprise principally benzotrihalides and substituted benzotrihalides such as benzotribromide, substituted benzotribromides, benzotrichloride and substituted benzotrichlorides. Such compounds may readily be prepared by the halogenation of toluene and the corresponding substituted toluenes. Other preparative methods such as alkylation of benzotrihalides may also be used. Illustrative examples of such trihalomethyl substituted aromatic compounds are benzotribromide, trichloro mesitylene, benzotrichloride, p-chlorobenzotrichloride, o-bromobenzotrichloride, alkylbenzotrichlorides, polyalkyl benzotrichlorides, 3-trichloromethyl pyridine, 4-trichloromethyl quinoline, p-phenylbenzotrichloride, trichloromethyl substituted polynucleus aromatic compounds such as trichloromethyl naphthalene, etc. The trichloromethyl substituted aromatic compounds are preferred for use in the reaction described herein because of their availability at the present time.

It will be noted that in each of the above examples the aromatic residue is non-functional; i.e., it does not contain any functional groups which might take part in or interfere with the reaction of the hereindescribed process.

Although the physical characteristics of the elemental phosphorus which may be used in the process are not critical, it is preferred to use red phosphorus.

The relative amounts of reactants determine the character of the product which is available therefrom. The function of the phosphorus appears to be associated with its ability to abstract halogen from two molecules of trihalomethyl compound, the resulting by-product consisting largely of phosphorus trihalide which is readily removed from the reaction mixture by distillation. Accordingly, a high phosphorus to trihalomethyl compound ratio will result in a product having less halogen than in the case of a reaction mixture which contains a low phosphorus to trihalomethyl compound ratio.

Generally, when it is desired to prepare dihalostilbenes, a ratio of one mole of phosphorus to one mole of trihalomethyl compound is used. On the other hand, the use of one mole of phosphorus per three moles of trihalomethyl compounds results in the formation of a relatively large proportion of substituted tetrahaloethanes.

As indicated, the reaction is catalyzed by an iodine compound selected from the class consisting of hydrocarbon iodides, ammonium iodides and phosphorus iodides. These catalysts are effective in very small amounts as small as 0.001% of the combined weight of the trihalomethyl-substituted aromatic compound and the elemental phosphorus reactants. The effectiveness of increased amounts of catalysts appears to level off above about 2.0% of this combined weight of the two reactants; larger amounts of catalysts may be used without apparent ill effects, but there appears to be no significant advantage attending the use of such larger amount.

The hydrocarbon iodides useful as the catalyst in this reaction may be alkyl, alkaryl, cycloalkyl, arylalkyl, or aryl iodides. Specific catalysts belonging to this broad class may be exemplified by methyl iodide, ethyl iodide, iso-octyl iodide, dodecyl iodide, docosyl iodide, cyclopentyl iodide, 2-methylcyclohexyl iodide, phenyl iodide, benzyl iodide, p-heptylphenyl iodide, naphthyl iodide, etc.

Another class of iodides contemplated for use as the catalyst herein comprises ammonium iodides. The term "ammonium iodides" is used herein in a generic sense to designate a well-known class of chemical substances having the general formula:

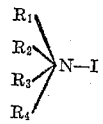

wherein $R_1$, $R_2$, $R_3$, and $R_4$ are each hydrogen or a hydrocarbon radical. This class encompasses quaternary ammonium iodides, the hydroiodides of amines, and the unsubstituted ammonium iodide ($NH_4I$) itself. The amine hydroiodides may be derived from primary, secondary, or tertiary amines of aliphatic, aromatic, or heterocyclic character. They may be illustrated more specifically by the hydroiodides of, for example, methylamine, dimethylamine, trimethylamine, hexylamine, dodecylamine, dinonylamine, pyridine, quinoline, piperazine, ethylenediamine, naphthylamine, pyrrole, morpholine, phenothiazine, p-dodecylaniline, dimethylaniline, 2-phenyl-ethylamine, oleylamine, stearylamine, etc.

The quaternary ammonium iodides may likewise be derived from aliphatic, aromatic, or heterocyclic amines. Examples illustrating such compounds include tetramethyl ammonium iodide, tribenzyl methyl ammonium iodide, naphthyl trimethyl ammonium iodide, methyl pyridinium iodide, dicyclohexyl dibutyl ammonium iodide, triethyl p-heptylphenyl ammonium iodide, etc.

The phosphorus iodides useful as the catalysts may be exemplified by phosphorus triiodide, phosphorus diiodide ($PI_2I_4$), and phosphorus iodochloride ($PI_2Cl_3$), and also organic phosphonium iodides such as tetramethyl phosphonium iodides, tetraphenyl phosphonium iodides, di-cyclohexyl phosphonium iodide, diphenyl diethyl phosphonium iodide, octyl phosphonium iodide, etc.

The reaction of the process requires somewhat elevated temperatures. The usual reaction will be run, for example, at a temperature within the range of 150° to 300° C., although within the limits imposed by the stability of the reactants the reaction may be carried out at even higher temperatures. Likewise, in some particular instances the process may be carried out at temperatures below 150° C., for example at 125° C. In most cases, the reaction will require at least one hour. The progress of the reaction may be noted by the amount of phosphorus trihalide which distills from the reaction mixture and when this distillation has ceased, it may be assumed that the reaction is complete. Usually all of the available phosphorus trihalide has been distilled within four or five hours. The reaction generally is carried out at atmospheric pressure although it may in some particular instance be carried out at super-atmospheric or reduced pressure.

When all of the phosphorus trihalide has distilled from the reaction mixture, there usually remains some unreacted phosphorus. This can be removed by adding an organic solvent such as benzene to the mixture and filtering the benzene solution from the phosphorus. Removal of the organic solvent from the filtrate by evaporation and subsequent distillation of the residue yields the desired product. The product may be purified further by crystallization from an organic solvent.

A particularly valuable application of the process resides in the use as starting materials of bis-(trihalomethyl) aromatic compounds. Such starting materials are illustrated by bis-(p-trihalomethyl) benzene which is the completely aliphatically halogenated product of p-xylene. It will be noted that in the process of this invention such a starting material is bifunctional. The reaction of a bis-trihalomethyl compound with phosphorus in the presence of small amounts of a catalyst is in effect a polymerization reaction.

Again depending upon the relative amounts of reactants employed, the polymeric product may contain either di-halostilbene units or tetrahalobibenzyl units. In either case the polymeric product is useful with regard to applications in the field of electrical insulation, etc.

The preparation of such polymers may be effected by the same process by which the hereinbefore described products are prepared.

The process of the invention is illustrated in more detail by the following examples:

Example 1

A mixture of 395 grams (2 moles) of benzotrichloride, 66 grams (2.1 moles) of red phosphorus, and 0.5 gram of iodoform was heated at 225° C. whereupon phosphorus trichloride was distilled from the mixture. The residue was extracted with 400 ml. of benzene. The extract was heated to remove benzene and then distilled at 188°–190° C./20 mm. Hg to yield 128 grams of crystalline product having a chlorine content of 27% which compares favorably with the theoretical value of 28.5% for alpha,alpha'-dichlorostilbene.

Example 2

A mixture of 393 grams (2 moles) of benzotrichloride, 63 grams (2 moles) of red phosphorus, and 0.5 ml. of methyl iodide was heated at 210° C. for 2.5 hours during which time 20 ml. of phosphorus trichloride was distilled off. The reaction mass was mixed with 20 ml. of methyl iodide and heated at 240° C. until 170 ml. of phosphorus trichloride was distilled from the mixture. The residue was dissolved in 420 ml. of benzene and the solution filtered. The filtrate was heated to remove benzene and then distilled at 190–195° C./21 mm. Hg to yield 215 grams of a crystalline product having a chlorine content of 28.8%, the theoretical chlorine content for alpha, alpha'-dichlorostilbene being 28.5%.

Example 3

A mixture of 390 grams (2 moles) of benzotrichloride, 62 grams (2 moles) of red phosphorus, and 1 gram of phenyl iodide was heated at 200°–220° C. for eight hours, during which time 172 grams of phosphorus trichloride was distilled from the mixture. The residue was dissolved in benzene and the solution filtered. The filtrate was heated to remove benezne and then distilled at 145°–215° C./0.5 mm. Hg to give 216 grams of a crystalline product having a chlorine content of 25.7%. The theoretical chlorine content for alpha,alpha'-dichlorostilbene is 28.5%.

Example 4

A mixture of 62 grams (0.2 mole) of bis(trichloromethyl) benzene, 4.5 grams (0.14 mole) of red phosphorus, 5 ml. of cyclohexyl iodide, and 300 grams of o-dichlorobenzene was heated at the reflux temperature (185° C.) for ten hours, during which time phosphorus trichloride was distilled from the mixture. Methanol was added to the distillation residue whereupon 26 grams of a solid polymeric product was obtained. The product was found to have a chlorine content of 43.2%.

Example 5

A mixture of 40 grams (0.21 mole) of benzotrichloride, 5.2 grams (0.17 mole) of red phosphorus, 4 ml. of dodecyl iodide, and 175 grams of o-dichlorobenzene was heated at the reflux temperature (185° C.) whereupon phosphorus trichloride was distilled from the mixture. The residue was filtered and the filtrate was heated to remove o-dichlorobenzene and yielded a crystalline product having a chlorine content of 42.6% (theoretical chlorine content for alpha,alpha,alpha',alpha'-tetrachlorobibenzyl being 44.4%).

Example 6

A mixture of 40 grams (0.12 mole) of benzotribromide, 2.8 grams (0.09 mole) of red phosphorus, 4 ml. of cyclohexyl iodide, and 150 ml. of o-dichlorobenzene was heated at the reflux temperature (185 °C.) for four hours whereupon phosphorus tribromide was distilled from the mixture. The residue was filtered and the filtrate yielded upon cooling at 5° C. for fifteen hours a crystalline product having a bromine content of 50% which compares favorably with the theoretical bromine content of 47.5% for alpha,alpha'-dibromostilbene.

Example 7

A mixture of 88 grams (0.4 mole) of bis(trichloromethyl) benzene, 4 grams (0.13 mole) of red phosphorus, 2.07 grams of pyridine hydroiodide, and 150 grams of o-dichlorobenzene was heated at 185° C. for six hours during which time phosphorus trichloride was distilled from the mixture. The distillation residue was filtered. Methanol was added to the filtrate, whereupon 43 grams of a solid polymeric product having a chlorine content of 57.4% was obtained.

Example 8

A mixture of 78 grams (0.4 mole) of benzotrichloride, 5 grams (0.16 mole) of red phosphorus, 1.2 grams of ammonium iodide, and 150 grams of o-dichlorobenzene was heated at 185° C. for five hours during which time phosphorus trichloride was distilled from the mixture. The residue was filtered. The filtrate was cooled to 5° C. whereupon a crystalline product precipitated. After recrystallization from benzene, the product was found to have a chlorine content of 44.3%, the theoretical chlorine content for alpha,alpha,alpha',alpha'-tetrachlorobibenzyl being 44.4%.

Example 9

The procedure of Example 8 was repeated except that 1.5 grams of ammonium iodide was used as the catalyst. The product obtained was found to have a chlorine content of 44.2%.

Example 10

The procedure of Example 8 was used except that 1.5 grams of butyl ammonium iodide was used as the catalyst. The product obtained was found to have a chlorine content of 46.3%.

Example 11

The procedure of Example 8 was used except that 1.7 grams of diisopropyl ammonium iodide was used as the catalyst. The product obtained was found to have a chlorine content of 44.2%.

Example 12

The procedure of Example 8 was used except that 1.5 grams of diphenyl dimethyl phosphonium iodide was used as the catalyst. The product obtained was found to have a chlorine content of 44.3%.

Example 13

A mixture of 97.5 grams (0.5 mole) of benzotrichloride, 10.7 grams (0.3 mole) of red phosphorus, 3 ml. of cyclohexyl iodide, and 300 grams of diphenyl oxide was heated at 235° C. for 4.5 hours during which time phosphorus trichloride was distilled from the mixture. The residue was filtered and the filtrate was first heated to remove diphenyl oxide and then distilled at 105°–112° C./0.1 mm. Hg to give 21 grams of alpha,alpha'-dichlorostilbene.

Example 14

A mixture of 97.5 grams (0.5 mole) of benzotrichloride, 10.7 grams (0.3 mole) of red phosphorus, 3.8 grams of decyl iodide, and 200 grams of diphenyl oxide was heated at 235° C. for four hours, during which time phosphorus trichloride was distilled from the mixture. The residue was filtered. The filtrate was heated at 65° C./2 mm. Hg to remove diphenyl oxide and then distilled at 112°–117° C./0.15 mm. Hg to yield 30 grams of a product having a chlorine content of 28% (the theoretical chlorine content for alpha,alpha'-dichlorostilbene being 28.5%).

Example 15

A mixture of 5.1 grams (0.16 mole) of red phosphorus, 95 grams (0.48 mole) of benzotrichloride, and 0.7 grams of phosphorus diiodide in 300 cc. of o-dichlorobenzene was heated at 185° C. for four hours whereupon phosphorus trichloride was removed from the reaction mass by distillation. The residue was filtered while hot. Upon cooling to room temperature, a crystalline product was obtained which was found to have a chlorine content of 44.1%, the theoretical chlorine content of alpha,alpha,-alpha',alpha'-tetrachlorobibenzyl being 44.4%.

The compositions of this invention are useful as plasticizers, as synergists for DDT, as insecticides e.g., water emulsion insecticidal composition comprising water containing 0.1–0.5% of the product of Example 1 and 0.5–2% of sodium dodecyl benzene sulfonate as the emulsifier.

Other modes of applying the principle of the invention may be employed, change being made as regards the details described, provided the features stated in any of the following claims or the equivalent of such be employed.

We therefore particularly point out and distinctly claim as our invention:

1. The process of preparing halogen-containing condensation products which comprises heating at a temperature within the approximate range of 125–300° C. a mixture of:
   (a) a trihalomethyl-substituted aromatic compound having the structure $$\text{Ar}(CX_3)_y$$

where Ar is a non-functional aromatic radical attached to the carbon atom through a benzenoid carbon atom, X is a halogen atom selected from the class consisting of chlorine and bromine atoms and y is an integer between 1 and 3;
   (b) from about one-third to about one mol per mole of (a) of elemental phosphorus; and
   (c) from about 0.001 to about 2.0% of the combined weight of (a) and (b) of a compound selected from the class consisting of hydrocarbon iodides, phosphorus iodides and ammonium iodides.

2. The process of claim 1 characterized further in that the trihalomethyl-substituted aromatic compound of (a) is a trichloromethyl-substituted benzene.

3. The process of claim 1 characterized further in that the trihalomethyl-substituted aromatic compound of (a) is benzotrichloride.

4. The process of claim 1 characterized further in that the compound of (c) is a hydrocarbon iodide.

5. The process of claim 1 characterized further in that the compound of (c) is an alkyl iodide.

6. The process of preparing halogen-containing compounds which comprises heating at a temperature within the approximate range of 125–300° C. a mixture of:
   (a) a trichloromethyl-substituted benzene having from one to three trichloromethyl groups,
   (b) from about one-third to about one mol per mol of (a) of elemental phosphorus, and
   (c) from about 0.001 to about 2.0% of the combined weight of (a) and (b) of an alkyl iodide.

7. The process of claim 1 characterized further in that the molar ratio of (a) to (b) is between about 1:1 and 3:1.

8. The process of claim 1 characterized further in that the compound of (c) is methyl iodide.

9. The process of claim 1 characterized further in that the compound of (c) is an aryl iodide.

10. The process of claim 1 characterized further in that the compound of (c) is phenyl iodide.

11. The process of claim 1 characterized further in that the compound of (c) is an ammonium iodide.

12. The process of claim 1 characterized further in that the compound of (c) is an ammonium iodide derived from an aliphatic amine.

13. The process of claim 1 characterized further in that the compound of (c) is an ammonium iodide derived from an aromatic amine.

14. The process of claim 1 characterized further in that the compound of (c) is an ammonium iodide derived from a heterocyclic amine.

15. The process of claim 1 characterized further in that the compound of (c) is methyl ammonium iodide.

References Cited in the file of this patent

UNITED STATES PATENTS 2,960,542    Le Suer et al. _____ Nov. 15, 1960